US005784375A

United States Patent [19]
Kalkunte et al.

[11] Patent Number: 5,784,375
[45] Date of Patent: Jul. 21, 1998

[54] ROTATING PRIORITY ARRANGEMENT IN AN ETHERNET NETWORK

[75] Inventors: Mohan Kalkunte, Sunnyvale; Jayant Kadambi, Milpitas; Jim Mangin, San Ramon; Gopal Krishna, San Jose, all of Calif.

[73] Assignee: Advanced Micro Devices, Inc., Sunnyvale, Calif.

[21] Appl. No.: 662,333

[22] Filed: Jun. 12, 1996

[51] Int. Cl.$^6$ ............................................. H04L 12/413
[52] U.S. Cl. ............................................. 370/448
[58] Field of Search ............................. 370/445, 446, 370/447, 448, 441, 462, 408; 340/825.5, 825.51

[56] References Cited

U.S. PATENT DOCUMENTS

| | | | |
|---|---|---|---|
| 4,979,168 | 12/1990 | Courtois et al. | 370/445 |
| 5,042,083 | 8/1991 | Ichikawa | 370/447 |
| 5,319,641 | 6/1994 | Fridrich et al. | 370/447 |
| 5,418,784 | 5/1995 | Ramakrishnan et al. | 370/445 |
| 5,485,147 | 1/1996 | Jaffe et al. | 370/445 |
| 5,526,355 | 6/1996 | Yang et al. | 370/448 |

FOREIGN PATENT DOCUMENTS

| | | |
|---|---|---|
| 0632621 A2 | 1/1995 | European Pat. Off. |
| 2232855 | 12/1990 | United Kingdom |
| WO92/10041 | 6/1992 | WIPO |

OTHER PUBLICATIONS

AMD, AM79C970 PCnet™-PCI Single-Chip Ethernet Controller for PCI Local Bus, Jun. 1994, pp. 1-868-1-1033.
Breyer et al., "Switched and Fast Ethernet: How It Works and How to Use It", Ziff-Davis Press, Emeryville, CA (1995), pp. 60-70.
Johnson, "Fast Ethernet: Dawn of a New Network", Prentice-Hall, Inc. (1996), pp. 158-175.

Primary Examiner—Chau Nguyen

[57] ABSTRACT

Delay times are modified in Ethernet network devices by adding an integer multiple of a delay interval to the minimum interpacket gap (IPG) interval, and decrementing the integer in each network station in response to detected activity on the media. Each station has a unique integer value from the range of zero to the number of stations (N) minus one. The unique integer value ensures that each station has a different delay interval in accessing the media after sensing deassertion of the receive carrier. The station having a zero integer value will have its integer counter reset to (N−1) after a station transmits a data packet on the network, and the stations having nonzero integer values decrement their respective integer counters. Each network station also includes a deferral timer that counts the maximum delay interval of (N−1) delay intervals plus the minimum IPG value, and thus establishes a bounded access latency for a half-duplex shared network.

26 Claims, 6 Drawing Sheets

ROTATING PRIORITY ARRANGEMENT IN AN ETHERNET NETWORK

FIELD OF THE INVENTION

The present invention relates to network interfacing and more particularly, to methods and systems efficiently accessing Ethernet media.

DESCRIPTION OF THE RELATED ART

Local area networks use a network cable or other media to link stations on the network. Each local area network architecture uses a media access control (MAC) enabling network interface cards at each station to share access to the media.

The Ethernet protocol ISO/IEC 8802-3 (ANSI/IEEE Std. 802.3, 1993 edition) defines a half-duplex media access mechanism that permits all stations to access the network channel with equality. Each station includes an Ethernet interface card that uses carrier-sense multiple-access with collision detection (CSMA/CD) to listen for traffic on the media. Transmission by a station begins after sensing a deassertion of a receive carrier on the media, indicating no network traffic. After starting transmission, a transmitting station will monitor the media to determine if there has been a collision due to another station sending data at the same time. If a collision is detected, both stations stop, wait a random amount of time, and retry transmission.

Any station can attempt to contend for the channel by waiting a predetermined time after the deassertion of the receive carrier on the media, known as the interpacket gap (IPG) interval. If a plurality of stations have data to send on the network, each of the stations will attempt to transmit in response to the sensed deassertion of the receive carrier on the media and after the IPG interval, resulting in a collision.

Ethernet networks mediate collisions by using a truncated binary exponential backoff (TBEB) algorithm, which provides a controlled pseudorandom mechanism to enforce a collision backoff interval before retransmission is attempted. According to the truncated binary exponential backoff algorithm, a station keeps track of the number of transmission attempts (j) during the transmission of a current frame. The station computes a collision backoff interval as a randomized integer multiple of a slot time interval, and attempts retransmission after the collision backoff interval. The station will attempt to transmit under the truncated binary exponential algorithm a maximum of sixteen times.

The collision backoff interval is calculated by selecting a random number of time slots from the range of zero to $2^j-1$. For example, if the number of attempts j =3, then the range of randomly selected time slots is (0,7); if the randomly-selected number of time slots is four, then the collision backoff interval will be equal to four slot time intervals. According to Ethernet protocol, the maximum range of randomly selected time slots is $2^{10}-1$.

The truncated binary exponential algorithm has the disadvantage that the range of randomly selected time slots (0, $2^j-1$) increases exponentially each time a specific station loses a retry attempt after collision, resulting in a higher probability that during the next collision mediation the station will randomly select a larger integer multiple of time slots and lose the next collision mediation. Thus, a new station that has data to transmit has a higher probability of winning a collision mediation than the station having a greater number of attempts. This effect is known as the capture effect, wherein a new station in the collision mediation effectively has a greater probability of capturing access to the media than the losing station until the maximum number of attempts has been reached.

Hence, collision-based networks having collision mediation require each colliding station to back off a random number of slot times, dependent on the number of attempts, before reattempting access to the medium. Such collision mediation reduces the network throughput and creates unbounded packet access latencies. Consequently, applications requiring bounded access latencies such as interactive multimedia cannot be supported on half-duplex networks.

Alternative network architectures have relied upon an external control mechanism that controls access to the shared medium. For example, a token ring network passes a token in a sequential manner to network stations. A station that acquires the token has the right to transmit on the network. Upon completion of the transmission, the token is passed on to the next station. The passing of the token, however, uses up bandwidth on the media. Bandwidth is also wasted if the token is received and then passed by a station that has no data to transmit. Hence, the token ring network limits network throughput because an individual station cannot transmit data until it receives the token, regardless of whether any other station has any data to send.

Another network arrangement specified by IEEE 802.12-1995, "Demand Priority Access Method, Physical Layer and Repeater Specification for 100 Mb/s Operation," also known as the VG ANYLAN network, uses a centralized hub to arbitrate among the request from network stations. The hub grants access to the stations in a round robin fashion. However, the VG ANYLAN network still requires control by a central hub.

Other proposals suggest the user of a central management entity to assign a slot number to each station on the network, where a station transmits only when a current slot number is equal to the station slot number. Such proposals also require a centralized management entity to manage the network.

DISCLOSURE OF THE INVENTION

There is a need for a method of accessing media of an Ethernet network that increases the throughput of the Ethernet network under heavy traffic loads.

There is also a need for a method of accessing media of an Ethernet network that eliminates the capture effect.

There is also a need for an arrangement for accessing the media of a half-duplex shared network that provides bounded packet access latencies.

There is also a need for a method of accessing media of a shared network, where only one station will attempt access of the media during a given interval, without the use of a centralized management entity or a token passed between stations.

These and other needs are attained by the present invention, where the delay time between sensing a deassertion of the receive carrier on the media and attempting access of the media is modulated based on the number of stations on the network and the detection of network activity.

According to one aspect of the present invention, a method of accessing a network media by a network station comprises the steps of determining a number of stations on the network, transmitting a data packet on the media, waiting, in response to completion of the transmitting step, a delay time including a predetermined interpacket gap interval and an integer multiple of a predetermined delay interval, the integer being related to the number of stations, and the predetermined delay interval being related to a predetermined slot time, determining existence of activity on the media during the waiting step, and resetting the delay time in response to detection of activity on the media by decrementing the integer. The resetting of the delay time in response to detection of network activity establishes a station transmission sequence where a transmitting station will assign itself the highest delay time relative to other stations on the network. As the station defers to other stations, the delay time is successively reduced by decrementing the integer. Hence, the method of the present invention enables network stations to use a protocol in a half-duplex shared network where only one station will attempt access without the necessity of any external control mechanism.

One particular embodiment of the above-described method of accessing media sets the delay time in a single timer, for example, a programmable interpacket gap (IPG) timer. Another embodiment of the above-described method sets a first timer equal to the integer multiple of the predetermined delay interval and a second timer equal to the predetermined interpacket gap interval. The first timer is started in response to completion of the transmitting step, and the second timer is started in response to a lapse of the first timer and a determined absence of activity during the interval counted by the first timer. Hence, the method of the present invention may be implemented in Ethernet-compliant network interface devices without hardware modification.

Another aspect of the present invention provides a network interface for connection with media of a network, comprising a carrier sensor sensing deassertion of a carrier on the media, a programmable timer counting an integer multiple of a predetermined delay interval in response to the sensed deassertion of the carrier, the predetermined delay interval being related to a predetermined slot time, a controller setting the integer determining the delay time between a range including zero and less than the number of stations (N) in the network in response to the sensed deassertion of the carrier, and a transmitter outputting a data packet onto the media in response to a determined absence of activity by the sensor during an interval including the integer multiple of predetermined delay intervals and the predetermined interpacket gap interval.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

Reference is made to the attached drawings, wherein elements having the same reference numeral designations represent like elements throughout and wherein.

BEST MODE FOR CARRYING OUT THE INVENTION

Figure 1:
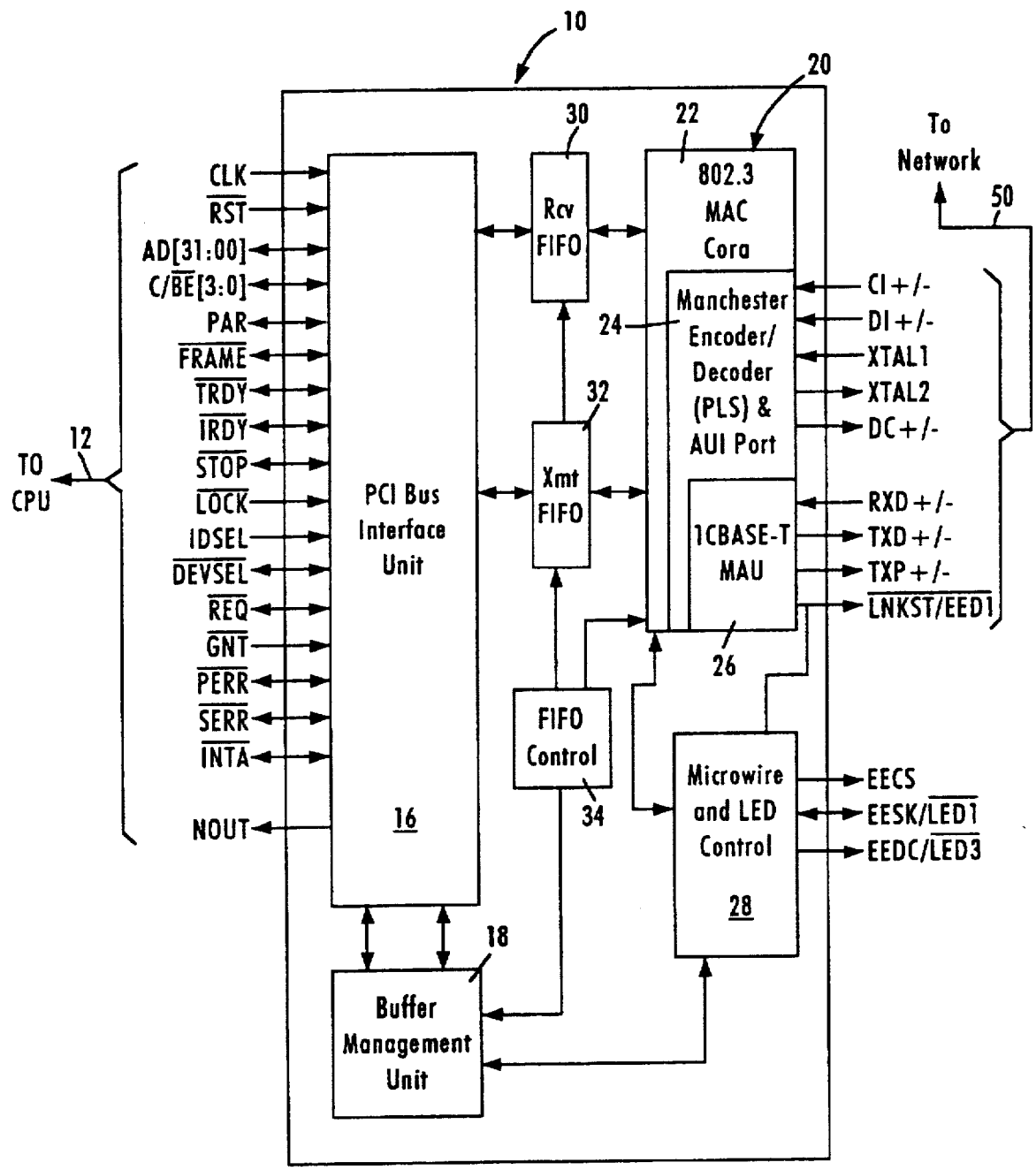
FIG. 1 is a block diagram of a network interface according to an embodiment of the present invention.

FIG. 1 is a block diagram of an exemplary network interface 10 that accesses the media of an Ethernet (ANSI/IEEE 802.3) network according to an embodiment of the present invention, resulting in avoidance of capture effect, increased throughput on the network during heavy traffic, and no collisions.

The network interface 10, preferably a single-chip, 32-bit Ethernet controller, provides an interface between a local bus 12 of a computer, for example, a peripheral component interconnect (PCI) local bus, and an Ethernet-based media 50. An exemplary network interface is the commercially available Am79C970 PCnet™-PCI Single-Chip Ethernet Controller for PCI Local Bus from Advanced Micro Devices, Inc., Sunnyvale, Calif., disclosed on pages 1–868 to 1–1033 of the AMD Ethernet/IEEE 802.3 Family 1994 World Network Data Book/Handbook, the disclosure of which is incorporated in its entirety by reference.

The interface 10 includes a PCI bus interface unit 16, a direct memory access (DMA) buffer management unit 18, and a network interface portion 20 including a media access control (MAC) core 22, an attachment unit interface (AUI) 24, and a twisted-pair transceiver media attachment unit (10BASE-T MAU) 26. The AUI port 24 follows the specification ISO/IEC 8802-3 (IEEE-ANSI 802.3). The interface 10 also includes a microwire EEPROM interface 28, a receive first in first out (FIFO) buffer 30, a transmit FIFO buffer 32, and a FIFO controller 34.

The PCI bus interface unit 16, compliant with the PCI local bus specification (revision 2.1), receives data frames from a host computer's CPU via the PCI bus 12. The PCI bus interface unit 16, under the control of the DMA buffer management unit 18, receives DMA and burst transfers from the CPU via the PCI bus 12. The data frames received from the PCI bus interface unit 16 are passed on a byte-by-byte basis to the transmit FIFO 32.

The buffer management unit 18 manages the reception of the data by the PCI bus interface unit 16 and retrieves information from header bytes that are transmitted at the beginning of transmissions from the CPU via the PCI bus 12. The header information identifying the byte length of the received frame is passed to the FIFO control 34.

The Manchester encoder and attachment unit interface (AUI) 24 includes a Collision In (CI+/−) differential input pair, operating at pseudo ECL levels, that signals to the network interface 10 when a collision has been detected on the network media. A collision occurs when the CI inputs are driven with a 10 MHz pattern of sufficient amplitude and pulse width that meets the ISO/IEC 8802-3 (ANSI/IEEE 802.3) standards. The Data Out (DO+/−) output pair of the AUI 24 transmits Manchester encoded data at pseudo ECL levels onto the network media 50. Similarly, the twisted pair interface 26 includes 10BASE-T port differential receivers (RXD+/−) and 10BASE-T port differential drivers (TXD+/−).

The media access control (MAC) 20 performs the CSMA/CD functions in response to signals from the interfaces 24 or 26. For example, carrier sense is detected by the DI and RXD signal paths of the AUI port 24 and MAU 26, respectively. The AUI 24 and the MAU 26 each include a physical layer that senses idle to non-idle transitions on the media 50, as specified in Ethernet (ANSI/IEEE 802.3)

protocol. The detection of activity on the media 50 is performed by the physical layer, which asserts a valid receive data indication to the MAC 20 layer in response to the detection and decoding of the preamble of a received data packet. Hence, the term activity on the media refers to reception of valid data. The sensed deassertion of the receive carrier occurs when the physical layer determines that the media 50 transitions from a nonidle to an idle state. The AUI 24 detects a collision by the CI inputs, and the MAU 26 detects a collision by sensing activity on both twisted pair signals RXD and TXD.

Figure 3:
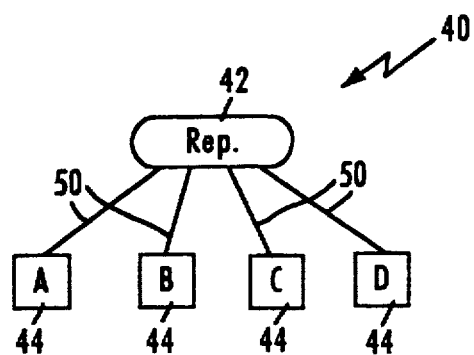
FIG. 3 is a diagram illustrating a layout of an Ethernet network.

FIG. 3 is a diagram illustrating a network 40 having a repeater 42 connecting four network stations 44 by the media 50. The media 50 may be either coaxial, fiber optic, or twisted pair wire, and hence may couple the interface 10 to 10BASE-T, 10BASE-2, 100BASE-TX, 100BASE-T4, or 100BASE-FX networks. The network 40 may operate at 10 megabits per second (10 Mbit/s), 100 megabits per second (100 Mbit/s), or 1000 megabits per second (1000 Mbit/s).

The disclosed embodiments provide a rotating priority scheme to improve performance efficiency by stations in Ethernet networks. The delay times in Ethernet network devices are modified by adding integer multiples of predetermined delay intervals to the predetermined interpacket gap interval (IPG) and waiting the modified delay time before attempting access of the media. As described below, resetting the delay time in response to detection of activity on the media by decrementing the integer ensures that only one station will have a minimal delay time equal to the predetermined interpacket interval. Hence, only one station will have access to the media at a given time, resulting in an arrangement that avoids collisions and entirely eliminates the capture effect. The rotating priority scheme also provides bounded access latencies, enabling applications requiring bounded access latencies to be used in half-duplex shared networks. Examples of applications requiring bounded access latencies include multimedia applications transporting video and audio data in real time or near-real time.

Figure 2A:
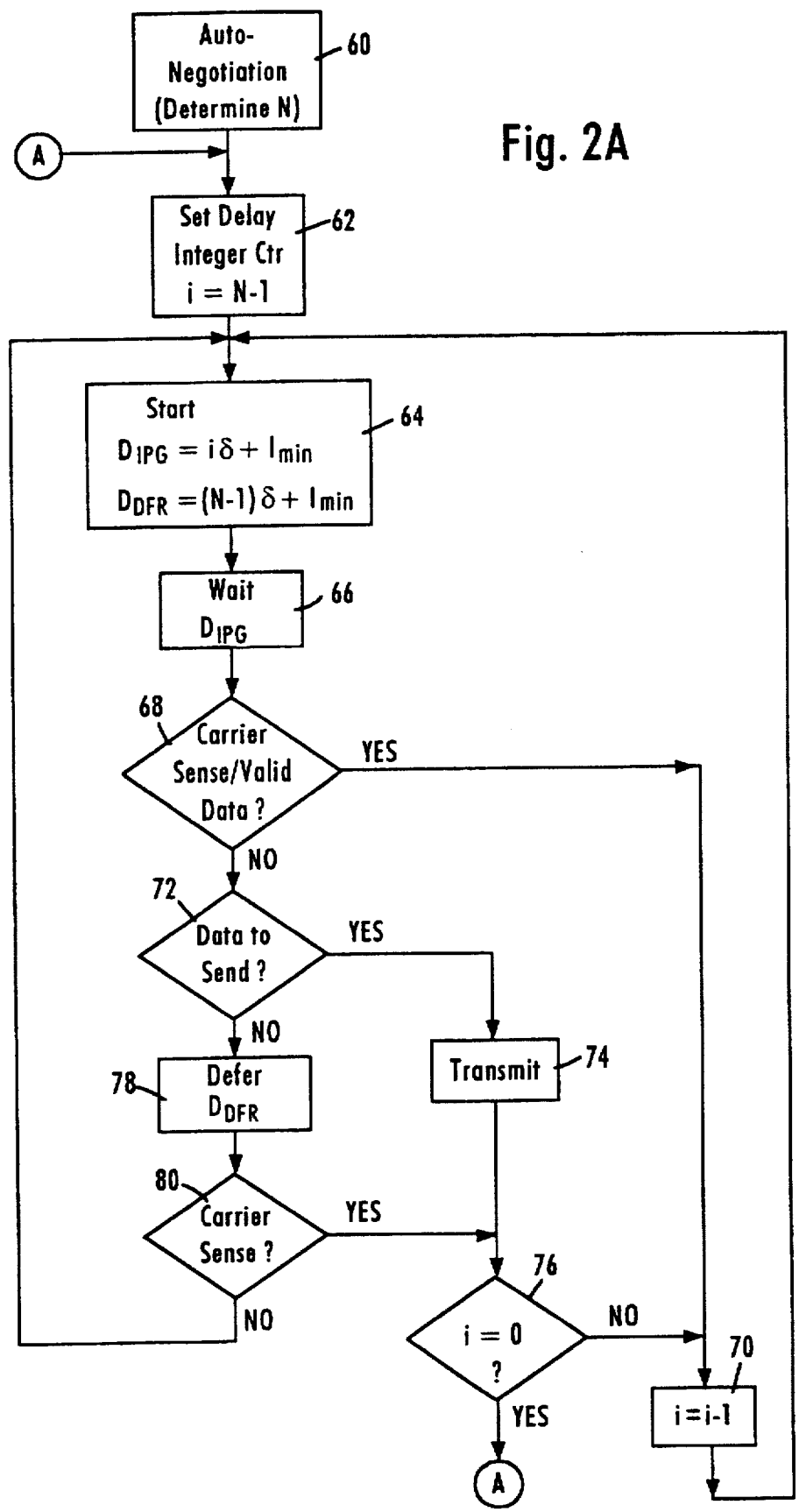
FIGS. 2A, 2B and 2C are flow diagrams of the method for accessing media of the Ethernet network according to first, second, and third embodiments of the present invention, respectively.
Figure 2B:
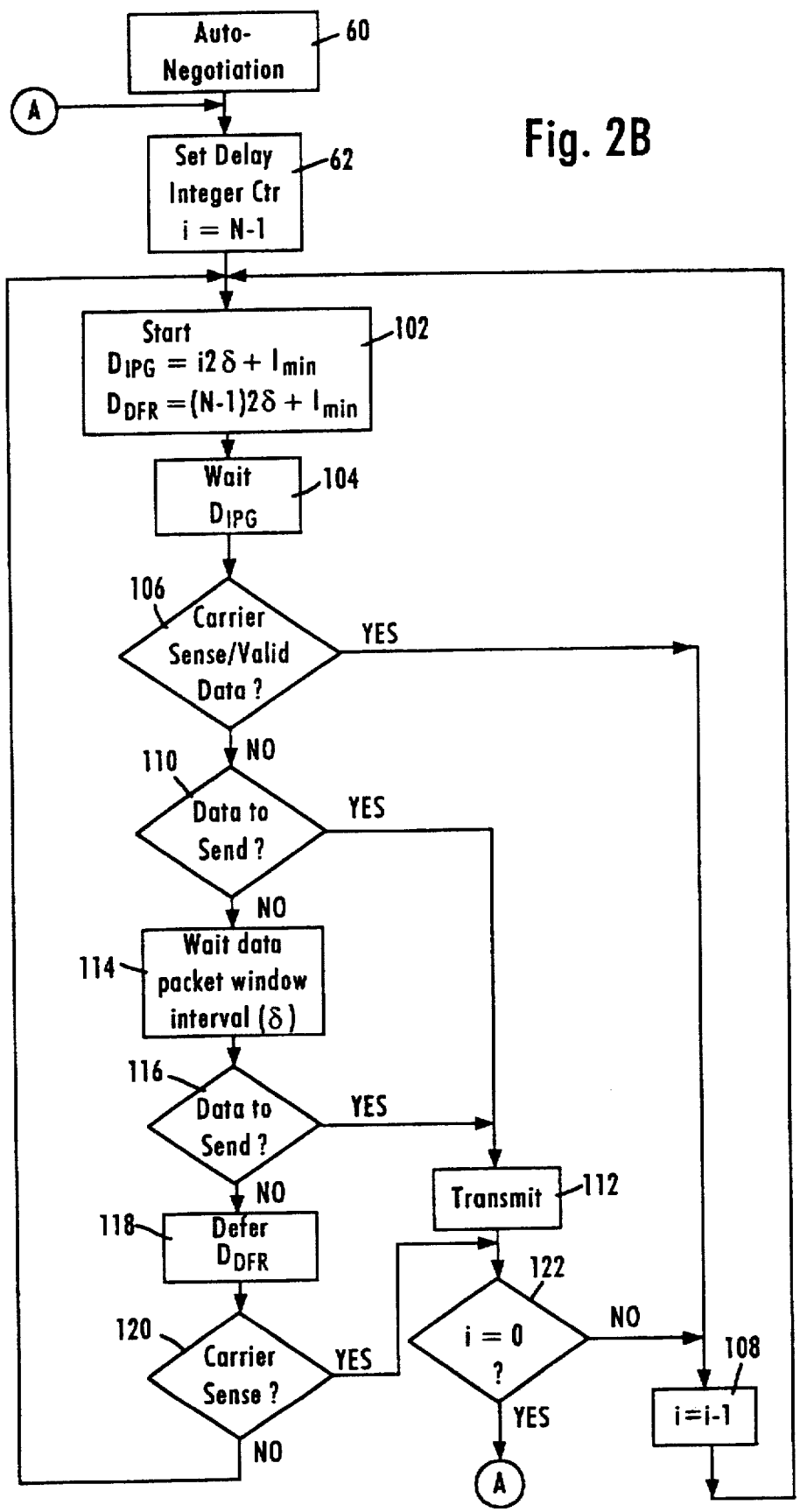
Figure 2C:
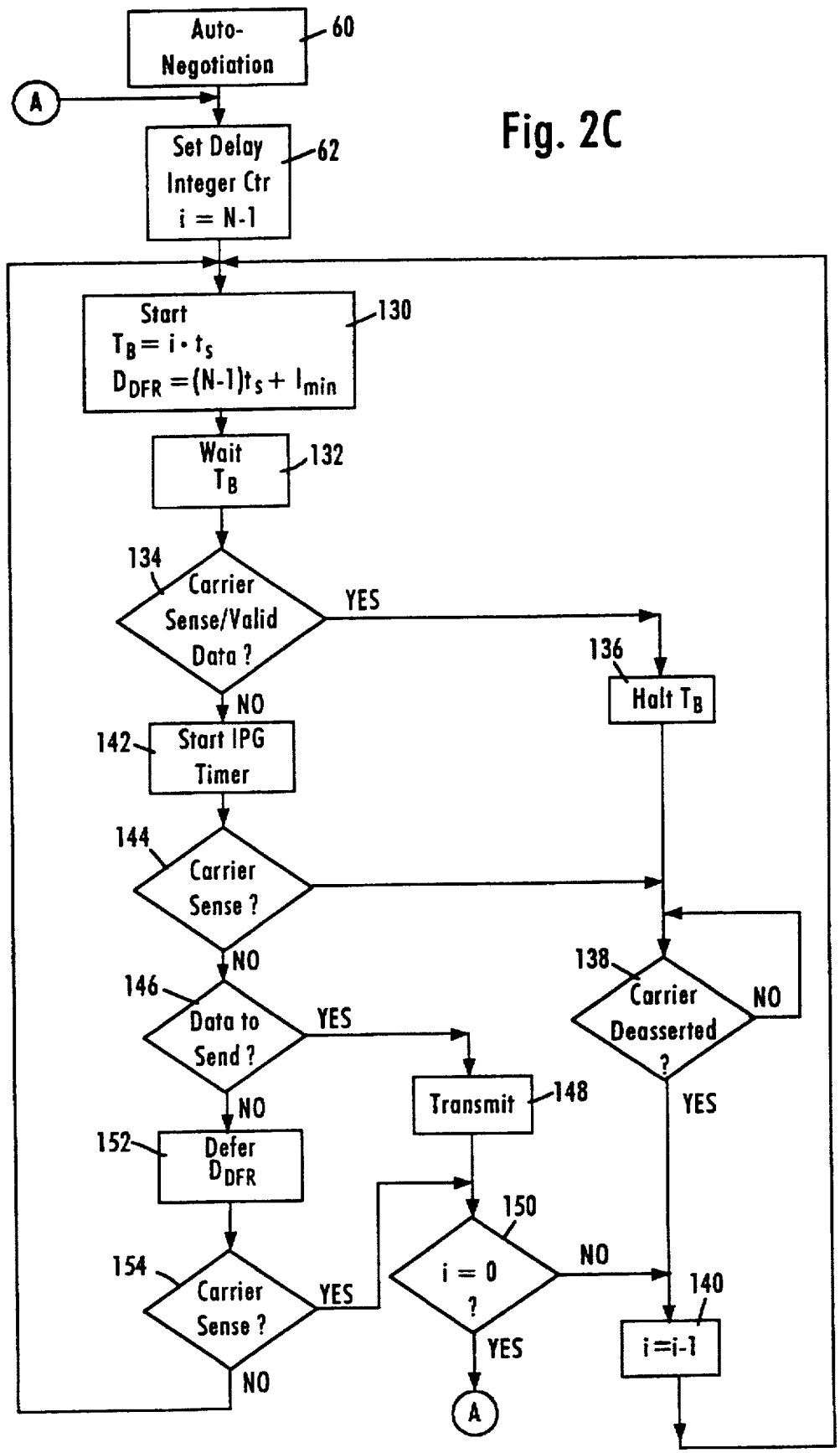

FIGS. 2A, 2B, and 2C are flow diagrams illustrating the method of accessing the media 50 of an Ethernet network according to first, second, and third embodiments, respectively. Any of the disclosed embodiments can be implemented by embedding executable code within a memory element in the MAC 22 (e.g., register, EPROM, EEPROM, flash memory).

Each of the three embodiments begins with the initial step of auto-negotiation 60, where the repeater 42 executes a link startup procedure every time a link to a station 44 is connected, powered on, or reset. The repeater 42 automatically configures the station 44 for operating according to the network configuration parameters, for example, network topology, signaling, distance to repeater, and number of stations on the network.

Upon completion of the auto-negotiation process 60, the network station interface 10 will receive and store network configuration data including the number of stations on the network. Additional details regarding repeaters and auto-negotiation are disclosed in Breyer et al. "Switched and Fast Ethernet: How It Works and How to Use It", Ziff-Davis Press, Emeryville, Calif. (1995), pp. 60–70, and Johnson, "Fast Ethernet: Dawn of a New Network", Prentice-Hall, Inc. (1996), pp. 158–175, the disclosures of which are incorporated in their entirety by reference.

After auto-negotiation is performed in step 60 of FIGS. 2A, 2B and 2C, the media access controller (MAC) 22 in step 62 sets a delay integer counter (i) equal to a maximum integer value of i=N−1, where (N) defines the number of stations 44 on the network 40. The integer counter (i) may be implemented as a separate counter, shown in FIG. 5.

FIG. 2A shows the rotating priority scheme of the first embodiment. After the integer counter (i) has been set in step 62, the media access controller (MAC) 22 sets a delay time ($D_{IPG}$) for an IPG timer and a deferral time ($D_{DFR}$) for a deferral timer (DFR) in step 64. The delay time and the deferral time are set in programmable IPG and DFR timers, respectively. As recognized in the art, the default value of the IPG timer is predetermined interpacket gap (IPG) interval, specified by Ethernet (ANSI/IEEE 802.3) protocol. The predetermined interpacket gap interval ($I_{MIN}$) is defined as 96 bit times for 10 megabit per second, 100 megabit per second, and 1000 megabit per second networks.

As shown in step 64, the IPG delay interval ($D_{IPG}$) is determined by adding to the minimum predetermined interpacket gap interval ($I_{MIN}$) an integer multiple (i) of a predetermined delay interval. The deferral counter value ($D_{DFR}$) is determined by adding to the minimimum predetermined interpacket gap interval ($I_{MIN}$) a maximum integer multiple (N−1) of the predetermined delay interval. The predetermined delay interval of the present invention is implemented in FIG. 2A as equal to δ. The value 2δ is defined as the maximum round trip delay between two stations, also defined as a slot time ($t_s$). Since a slot time ($t_s$) is defined as 512 bit times for 10 MB/s and 100 MB/s networks, the value 2δ also equals 512 bit times for a 10 MB/s and 100 MB/s networks. Hence, the delay 2δ has a duration of 51.2 microseconds and 5.12 microseconds in 10 megabit per second and 100 megabit per second networks, respectively. The value 2δ has a preferred value of 4096 bit times for 1000 megabit per second networks, although other values may be used consistent with the network topology and propagation characteristics.

Hence, the MAC 22 in step 64 sets the programmable IPG timer to a value $D_{IPG}=i\delta+I_{MIN}$, and the deferral timer DFR to a maximum delay time $D_{DFR}=(N-1)\delta+I_{MIN}$. The MAC 22 simultaneously starts the IPG timer and the deferral (DFR) timer in response to completion of auto-negotiation with the repeater 42, for example, when the station receives a link active signal from the repeater. As described below, the IPG timers and deferral timers are also simultaneously restarted in response to the deassertion of the receive carrier on the media, or if the deferral timer lapses without any detected activity on the media 50.

After starting the IPG and deferral timers in step 64, the MAC 22 waits in step 66 the delay time ($D_{IPG}$). While waiting the delay time ($D_{IPG}$), the MAC 22 determines the existence of activity on the media 50 in step 68. Activity is detected by the MAC 22 in step 68 when data transmitted by a transmitting station is detected by the MAC 22. Specifically, the physical layer of the MAC detects the transition of the media 50 from an idle to non-idle state, as specified in the Ethernet (ANSI/IEEE 802.3) protocol. Upon detecting the non-idle state, the physical layer decodes the preamble of the transmitted data and asserts a control signal representing a valid receive data indication to the MAC. The valid receive data indication represents the detection of activity, i.e., valid data, on the media.

Sensing deassertion of the receive carrier occurs when the physical layer detects the transition of the media 50 from non-idle to idle state. In response to deassertion of the receive carrier, the MAC 22 decrements the integer counter (i) to a value (i=i−1) in step 70, and resets and restarts the IPG and deferral timers in step 64.

If in step 68 the MAC 22 does not detect any activity on the media while waiting the delay time ($D_{IPG}$), the MAC 22 checks in step 72 whether the transmit FIFO 32 has a data packet to send. If the transmit FIFO 32 has data to send, the MAC 22 begins to transmit the data packet in step 74. After transmission is completed, the MAC 22 checks in step 76 whether the integer counter (i) equals 0. If the integer (i) was equal to 0, then the programmable IPG timer had a minimum delay time of $D_{IPG}=I_{MIN}=96$ bit times. Hence, since the station had priority transmission by having the delay time set to the minimum interpacket gap interval ($I_{MIN}$), the integer counter is reset in step 62 to equal the maximum integer value (N−1). If in step 76 the integer (i) was not equal to 0, then the station was able to transmit after deferring to another station that had priority transmission but had no data to send. Hence, the transmitting station having a nonzero integer value (i) maintains its position in the priority sequence of stations, and decrements its integer counter in step 70.

If in step 72 the MAC 22 determines that the transmit FIFO 32 has no data to send, then the MAC 22 enters a deferral state in step 78 to wait the remaining interval ($D_{DFR}-D_{IPG}$) counted by the deferral timer. The MAC 22 checks in step 80 whether a carrier is detected on the media 50 during the remainder of the deferral interval ($D_{DFR}$). If activity is detected on the media while waiting the maximum delay time ($D_{DFR}$), the MAC 22 checks in step 76 if the integer value (i) equals 0 in step 76. If the integer value equals 0, then the integer counter is reset in step 62. Otherwise, the nonzero integer value is decremented in step 70. If in step 80 the MAC 22 detects an absence of activity on the media during the maximum delay time, then the waiting step is repeated and the IPG and deferral counters are restarted in step 64.

Hence, the method of modulating the delay time based on the number of stations on the network establishes a rotating priority arrangement, where the sequence of stations having priority access to the media is rotated by successively decrementing the delay time that a station must wait after sensing deassertion of the receive carrier on the media before attempting transmission.

Figure 4:
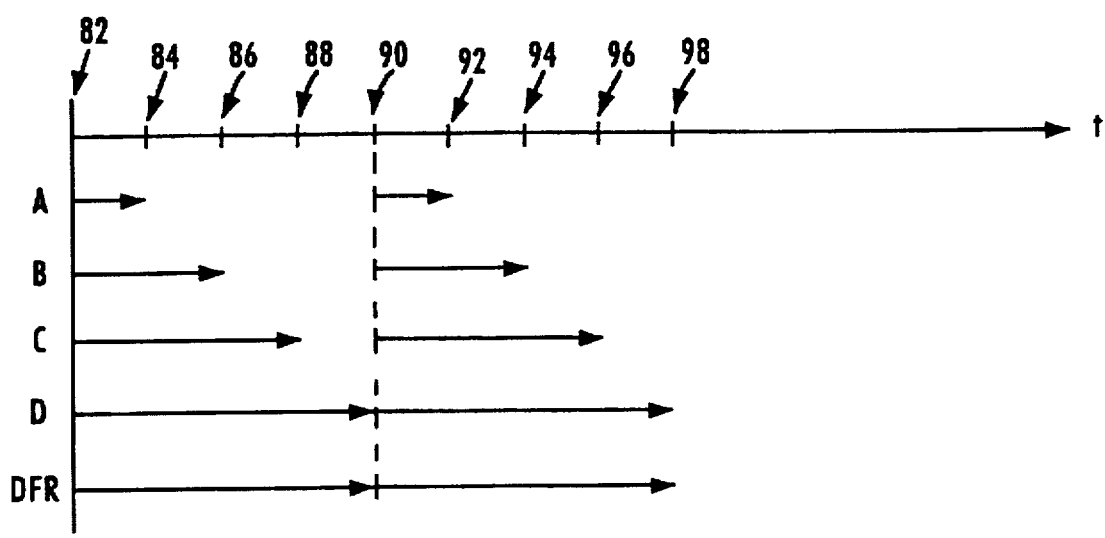
FIG. 4 is a diagram illustrating the operation of delay timers and deferral timers in respective stations of the network.

FIG. 4 is a diagram illustrating the priority sequence of the present invention. Specifically, FIG. 4 illustrates the counting of the respective IPG and deferral timers in the network stations A, B, C, and D of FIG. 3. The deferral timers in each of the stations A, B, C, and D, count a maximum delay time ($D_{DFR}$). The integer values stored in the stations A, B, C, and D, are $i_A=0$, $i_B=1$, $i_C=2$ and $i_D=3$, respectively. As shown in FIG. 4, all IPG and deferral timers start simultaneously at the deassertion of a receive carrier on the media 50 at event 82. Since station A has an integer value of $i_A=0$, the IPG delay interval ($D_{IPG}$) for station A equals $I_{MIN}$. Hence, the IPG counter for station A lapses at event 84, 96 bit times after deassertion of the receive carrier. If station A had data to transmit, station A would begin transmission at event 84. The IPG timers of stations B, C, and D, however, are still counting. Hence, if station A were to begin transmission, stations B, C, and D would wait for transmission to be completed, decrement their internal counters in response to a valid receive data from the physical layer (see step 70), and restart the counters in step 64 in response to deassertion of the carrier sense.

As shown in FIG. 4, station B has an IPG delay interval ($D_{IPG}$)=1δ+$I_{MIN}$. Hence, the IPG timer of station B lapses at event 86. Assuming station A had no data to transmit, station B would begin transmission at event 86 in response to lapse of the corresponding IPG timer and detecting an absence of activity on the media during the corresponding IPG interval. Similarly, the IPG timer of station C would lapse at event 88, and station C would begin transmission if stations A and B did not have any data to send, i.e., if there was an absence of activity on the media during the waiting by station C. Finally, the IPG timer of station D would lapse at event 90, and would attempt transmission if stations A, B and C did not have any data to send, causing an absence of activity on the media during the waiting by station D.

As shown on FIG. 4, each of these stations A, B, C and D have corresponding delay times between a range of the minimum interpacket gap interval ($I_{MIN}$) equal to 96 bit times and the maximum delay of (N−1) delay intervals plus the predetermined IPG interval. As shown in FIG. 4, the deferral counter DFR lapses at the same time that the maximum delay interval counted by station D. Hence, if none of the stations A, B, C, and D have any data to send, the timers are reset and the sequence is repeated without decrementing any of the integer counters. Hence, if stations A, B, C, and D have no data to send between events 82 and 90, then the IPG counters for stations A, B, C, and D are reset at event 90 and lapse at events 92, 94, 96, and 98, respectively.

FIG. 4 also illustrates the use of the deferral timer (DFR), where if stations A, B, and C have no data to send, the stations must wait the maximum delay time before attempting transmission. Hence, if station A has no data to transmit at event 84, station A must wait until event 92 before transmitting any data packets subsequently received by the corresponding transmit FIFO 32. Since station A has the shortest delay time $D(_{IPG})$, the embodiment of FIG. 2A requires that if station A does not transmit data at event 84, then the integer counter (i) will be reset if any other station (B, C or D) transmits data on the media. Hence, the rotating priority arrangement of the present invention ensures that a station having the minimum delay time will subsequently have the corresponding integer counter reset unless no station has transmitted any data on the media. Table 1 illustrates the sequence of integer values stored in the respective stations:

TABLE 1

| STATION | SEQUENCE 1 | SEQUENCE 2 | SEQUENCE 3 | SEQUENCE 4 | SEQUENCE 5 |
|---|---|---|---|---|---|
| A | 0 | 3 | 2 | 2 | 1 |
| B | 1 | 0 | 3 | 3 | 2 |
| C | 2 | 1 | 0 | 0 | 3 |
| D | 3 | 2 | 1 | 1 | 0 |

As shown in Table 1, sequence 1 correspondence to the sequence of FIG. 4, with stations A, B, C, and D having integer values 0, 1, 2, 3, respectively. Assuming station A has data to send, the integer counters are decremented in station stations B, C, and D and the station A integer counter is reset to obtain the integer sequence in sequence 2, where station B has the shortest delay time. Assuming station B has data to send in sequence 2, each station will set the corresponding integer counter to produce sequence 3, where station C has the minimum delay time.

Assuming during sequence 3 that no station has any data to send, then all the stations will restart their respective timers in response to lapse of the deferral timer and detection of absence of activity on the media during the maximum delay time. Hence, the stations will begin counting sequence 4 (identical to sequence 3) after lapse of the deferral counter interval ($D_{DFR}$).

Assuming in sequence 4 that stations A, C and D have no data to send, but station B has data to send, then station B will transmit data and the integer counters will be reset accordingly to sequence 5. Hence, even though station B transmitted data, its corresponding integer counter ($i_B$) is decremented because the integer value was not equal to zero. Hence, the arrangement of the present invention ensures that only one station has access to the media at any given time. Moreover, the present invention eliminates the capture effect entirely, and provides a collision avoidance mechanism. Further, the present invention provides a bounded access latency interval equal to (N) times the maximum packet transmission time. Since a given station will have a bounded access latency between transmission of two packets, the present invention enables the use of time-sensitive applications such as multimedia in half-duplex shared networks.

FIG. 2B is a variation of the embodiment of FIG. 2A, where a transmission window interval is added at the end of the waiting step if the MAC 22 determines the transmit FIFO 32 does not have data to send. Specifically, if a station does not have a data packet to send upon the lapse of the IPG timer, the embodiment of FIG. 2A requires the station to wait for an entire cycle ($D_{DFR}$) before attempting transmission of a subsequently-received data packet. The embodiment of FIG. 2B, however, provides a transmission window interval that begins at the waiting interval defined by the IPG timer. If the MAC 22 detect the presence of a data packet for transmission during the transmission window interval, the data packet is transmitted by the MAC 22.

The embodiment of FIG. 2B includes the initial steps of auto-negotiation in step 60 and setting the delay integer counter (i) equal to the maximum integer value (N-1) in step 62. Upon sensing deassertion of the receive carrier, the MAC 22 starts the IPG timer and the deferral timer in step 102. Since the embodiment of FIG. 2B includes a transmission window interval corresponding to one-half the slot time (i.e., equal to δ), the predetermined delay interval multiplied by the integer (i) in the IPG timer and (N-1) in the deferral timer (DFR) is set to 2δ. Hence, the term predetermined delay interval of the present invention is defined as a delay interval related to the predetermined slot time ($t_s$) and being multiplied by a maximum integer (N-1) to define a maximum delay time ($D_{DFR}$), and variable integers (i) to define different delay times in respective stations.

After the MAC 22 starts the IPG timer and the deferral timer in step 102, the MAC 22 waits in step 104 for the IPG interval ($D_{IPG}$) defined in step 102. While waiting the specified IPG interval, the MAC 22 checks in step 106 if the carrier is detected on the media 50. If a carrier is detected in step 106, the MAC 22 decrements the integer counter in step 108 upon deassertion of the receive carrier and restarts the timers in step 102. If in step 106 there is no carrier sense detected and the IPG timer has lapsed, the MAC 22 checks in step 110 if the transmit FIFO 32 has data to send. If the transmit FIFO 32 has data to send, the data packet is transmitted on the media in step 112. However, if the transmit FIFO does not have data to send at the end of the IPG delay interval ($D_{IPG}$), the MAC 22 waits for a data packet during a transmission window interval equal to Δ in step 114. During the transmission window interval (δ), the MAC 22 checks if the transmit FIFO 32 has data to send in step 116. If the transmit FIFO 32 now has data to send, the data packet is transmitted in 112. Hence, the embodiment of FIG. 2B provides a transmission window interval providing a station extra time to determine whether the corresponding transmit FIFO has data to send.

If in step 116 the MAC 22 determines that there is no data to send, then the station defers in step 118 for the remainder of the deferral period $D_{DFR}$ defined in step 102. The MAC 22 checks during the deferral interval ($D_{DFR}$) whether a receive carrier is sensed on the media in step 120. If a receive carrier is sensed, the MAC 22 checks whether the stored integer value is equal to zero in step 122. If the integer value (i) equals zero, then the integer counter is reset in step 62, otherwise the nonzero integer value is decremented in step 108.

The embodiments of FIGS. 2A and 2B use a programmable IPG timer to count the delay time ($D_{IPG}$) including the predetermined interpacket gap interval ($I_{MIN}$) and an integer multiple (i) of a predetermined delay interval related to a predetermined slot time ($t_s$). As described above, the predetermined delay interval equals δ and 2δ in FIGS. 2A and 2B, respectively.

FIG. 2C is a flow diagram illustrating another embodiment that uses a backoff collision counter in conjunction with a nonprogrammable IPG timer to calculate the delay time of a station. Hence, the delay time illustrated in FIG. 4 for a network station is implemented using an IPG counter having a fixed count value of 96 slot times in conjunction with a collision counter that is normally used to calculate backoff intervals during collision mediation.

As shown in FIG. 2C, the method begins with auto-negotiation in step 60 and setting the delay integer counter (i) to a maximum integer value (N-1) in step 62. Upon deassertion of a receive carrier, the MAC 22 starts a collision backoff timer ($T_B$) that count an integer multiple of a predetermined delay equal to the slot time ($t_s$). The deferral counter ($D_{DFR}$) is set to the maximum delay interval consisting of the predetermined IPG ($I_{MIN}$) and a maximum integer multiple (N-1) of the predetermined delay interval ($t_s$).

After the MAC 22 starts the backoff timer and deferral timers in step 130 in response to sensed deassertion of the receive carrier, the MAC 22 waits the backoff interval in step 132. During the waiting in step 132, the MAC 22 checks in step 134 whether a carrier is sensed on the media. If the MAC 22 senses the receive carrier, the collision backoff timer ($T_B$) is halted in step 136. The MAC 22 then monitors the media using the CSMA/CD sensor in step 138 to detect deassertion of the carrier. When the CSMA/CD senses deassertion of the receive carrier in step 138, the integer counter is decremented in step 140 and the collision backoff and deferral timers are restarted in step 130.

Hence, the programmable collision backoff timer ($T_B$) can be used instead of a programmable IPG timer in order to count the integer multiple of the predetermined delay interval. If in step 134 the MAC 22 determines an absence of carrier activity during the waiting in step 132, the MAC 22 starts the IPG timer in step 142 in response to the lapse of the collision backoff timer ($T_B$). The IPG timer counts the predetermined minimum IPG interval ($I_{MIN}$) of 96 bit times. The MAC 22 checks during the IPG interval in step 144 whether a carrier is sensed on the media. If a carrier is sensed, the MAC 22 waits until deassertion of the receive carrier in step 138 and decrements the integer timer in step 140 to restart the timers. However, if in step 144 there is no carrier sensed, the MAC 22 checks in step 146 if the transmit FIFO 32 has a data packet to send. If the transmit FIFO 32 has data to send, the data packet is transmitted in step 148 after the IPG timer has lapsed. Hence, the delay time (D) of a station is implemented using the collision backoff timer ($T_B$) and the IPG timer counting the predetermined minimum IPG interval ($I_{MIN}$) to obtain the overall delay time $D=T_B+I_{MIN}$.

Upon completion of transmission of the data packet in step 148, the MAC 22 checks in step 150 if the stored integer value (i) in the integer counter has a value of 0. If the integer has a nonzero value, the integer counter is decremented in step 140, otherwise the integer having a zero value is reset in step 162.

If in step 146 the MAC 22 determines there is no data to send, the MAC 22 defers for the remainder of the maximum delay interval ($D_{DFR}$), and checks in step 154 if a receive carrier is sensed during the deferral interval. If a receive carrier is sensed during the deferral interval in step 154, the integer counter is reset accordingly. Otherwise, if no carrier is sensed, the timers are reset in step 130.

Figure 5:
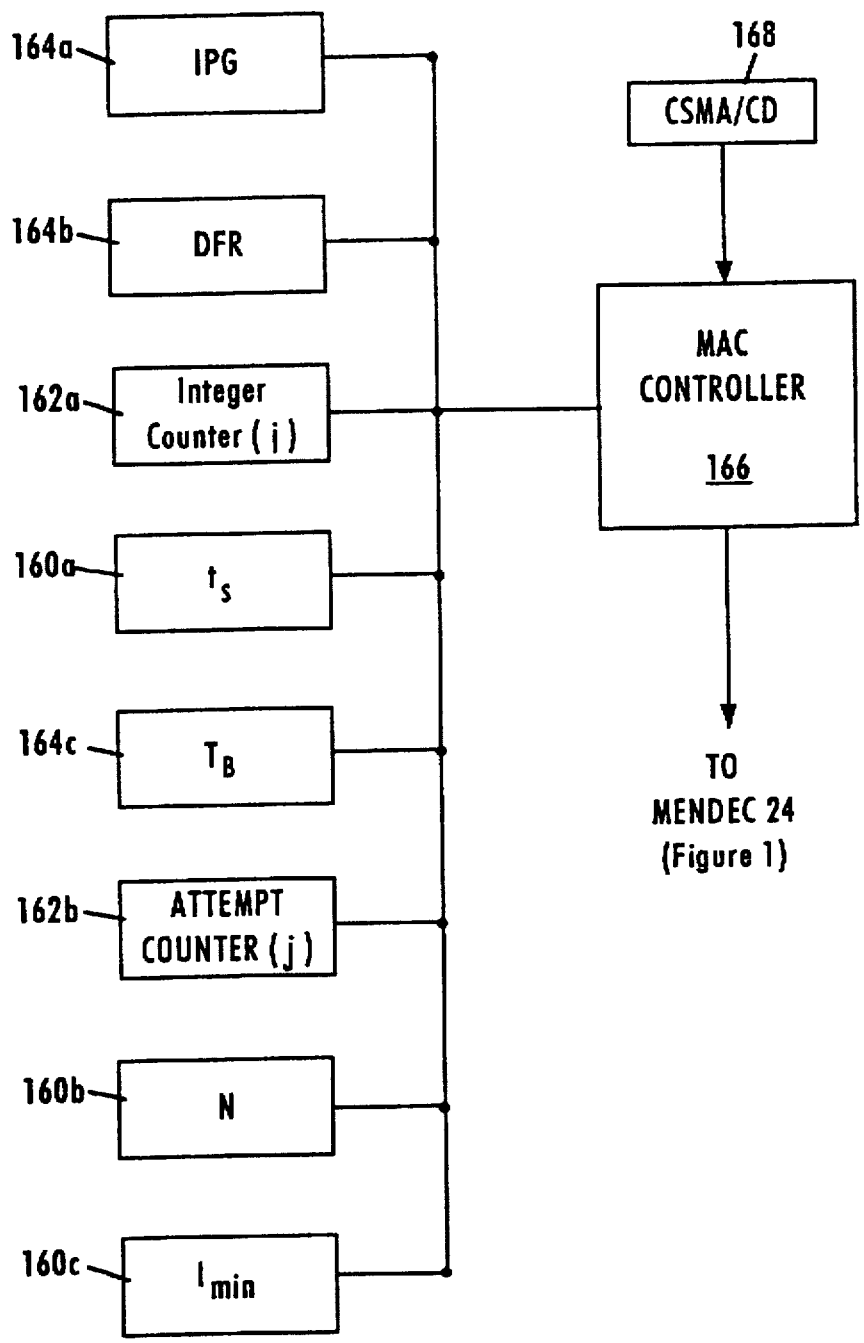
FIG. 5 is a block diagram of the media access control (MAC) of FIG. 1.

FIG. 5 is a block diagram illustrating the functional components of the MAC 22. The media access control 22 includes a plurality of registers 160, counters 162, and timers 164. The MAC 22 also includes a controller 166 and a carrier sense multiple access/collision detection (CSMA/CD) portion 168. The registers 160a, 160b and 160c are stored with the time slot ($t_s$), number of stations (N), and minimum interpacket gap interval ($I_{MIN}$), respectively, during initial auto-negotiation with the repeater. The integer (i) is counted in an integer counter 162a, and the number of collisions (j) encountered during conventional TBEB collision mediation is counted in counter 162b. As described above with respect to FIG. 2C, the integer counter 162a may be deleted and the attempt counter 162b may be used to count the integers (i).

Timers 164a, 164b and 164c count the minimum IPG ($I_{MIN}$), the deferral interval ($D_{DFR}$), and the backoff interval ($T_B$) of FIG. 2C. According to FIG. 2C, the IPG timer 164a is a non-programmable timer that counts 96 bit times, and timer 164c is a programmable collision backoff timer for counting a collision backoff interval according to the Truncated Binary Exponential Backoff (TBEB) algorithm in response to a detected collision, as described above. The IPG timer 164a may also be a programmable timer that is set with the delay time ($D_{IPG}$) according to the embodiments of FIGS. 2A and 2B. Use of a programmable IPG timer 164a hence eliminates the need for collision backoff timer 164c in implementing the rotating priority arrangement of the present invention.

In addition the IPG counter 164a, deferral timer 164b and the backoff interval timer 164c may be implemented as an array of registers each holding different counter values based on the value of (N). Hence, the delay values may be calculated by using the value (N) as a pointer that points to a register having the appropriate delay value.

The MAC controller 166 starts the appropriate delay timers 164 in response to a signal from the CSMA/CD 168 indicating that deassertion of the receive carrier on the media has been sensed. The MAC controller 166 sends an instruction to the Manchester encoder/decoder 24 (MENDEC) to attempt access to the media after the appropriate timers 164 have reached the programmed delay times specified in FIGS. 2A, 2B or 2C.

According to the present invention, the addition of integer multiples of a predetermined delay interval is consistent with Ethernet protocol because this protocol specifies only minimum delay times. Hence, the present invention provides a collision avoidance mechanism that eliminates the capture effect, improves network throughput during heavy traffic conditions, and provide bounded access latencies.

Although the disclosed embodiment are described with respect to Ethernet networks, it will be appreciated that the present invention may also be applicable to other network protocols. In addition, the present invention may be applied to different types of data, for example, TCP/IP and IPX type of traffic.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

We claim:

1. In a network station coupled to media of a network, a method of accessing the media, comprising:

determining a number of stations (N) on the network;

first transmitting a first data packet on the media;

waiting, in response to completion of the first transmitting step, a delay time including a predetermined inter-packet gap interval and an integer multiple of a predetermined delay interval, the integer being related to said number of stations (N), the predetermined delay interval being related to a predetermined slot time;

determining existence of activity on the media during said waiting step; and resetting said delay time in response to detection of said activity by decrementing said integer.

2. The method of claim 1, further comprising second transmitting a second data packet at an end of said waiting step in response to a determined absence of said activity.

3. The method of claim 2, further comprising decrementing said integer in response to completion of the second transmitting step and if said integer is not zero.

4. The method of claim 3, further comprising resetting said integer to a maximum integer value in response to completion of the second transmitting and if said integer is zero.

5. The method of claim 4, wherein said maximum integer value is N−1.

6. The method of claim 2, wherein said second transmitting step comprises:

first detecting one of a presence and absence of the second data packet for transmission at the end of said waiting step;

waiting a transmission window interval corresponding to said slot time, and beginning at the end of said waiting step, if said first detecting step determines the absence of said second data packet;

second detecting during said transmission window interval one of said presence and absence of said second data packet for said transmission; and transmitting said second data packet in response to detecting the second data packet by one of said first and second detecting steps.

7. The method of claim 6, further comprising decrementing said integer in response to completion of the second transmitting step and if said integer is not zero.

8. The method of claim 1, wherein said waiting step comprises:

setting a first timer equal to the delay time; and starting the first timer in response to the completion of the first transmitting step.

9. The method of claim 8, wherein the first timer is a programmable Interpacket Gap (IPG) timer.

10. The method of claim 8, wherein said predetermined interval is substantially equal to one half the slot time.

11. The method of claim 8, wherein said predetermined interval is substantially equal to the slot time.

12. The method of claim 11, further comprising:

first detecting one of a presence and absence of a second data packet for transmission at the end of said waiting step;

waiting a transmission window interval corresponding to said slot time, and beginning at the end of said waiting step, if said first detecting step determines the absence of said second data packet;

second detecting during said transmission window interval one of said presence and absence of said second data packet for said transmission; and transmitting said second data packet in response to detecting the second data packet by one of said first and second detecting steps.

13. The method of claim 12, further comprising decrementing said integer in response to completion of the second transmitting step and if said integer is not zero.

14. The method of claim 1, wherein said waiting step comprises:

setting a first timer equal to the integer multiple of the predetermined delay interval and a second timer equal to said predetermined interpacket gap interval;

starting the first timer in response to the completion of the first transmitting step; and starting the second timer in response to lapse of the first timer and a determined absence of said activity during said integer multiple of the predetermined delay interval.

15. The method of claim 14, wherein said resetting step comprises:

halting said first timer in response to said detection of said activity; and decrementing said integer in response to deassertion of said activity on the media, the waiting step resetting the first timer to the decremented integer multiple of the predetermined delay interval.

16. The method of claim 1, further comprising:

setting a deferral timer equal to a maximum delay time including said predetermined interpacket gap interval and a maximum integer multiple of said predetermined delay interval, the maximum integer multiple being less than said number of stations (N), said integer multiple being no greater than said maximum integer multiple;

starting said deferral timer simultaneously with said waiting step in response to completion of the first transmitting step; and repeating said waiting, starting, and determining steps in response to the detection of absence of activity on the media during said maximum delay time.

17. The method of claim 1, wherein the determining a number of stations comprises:

receiving a data packet identifying said number of stations (N) from a repeater; and storing the number of stations (N) in the network station.

18. The method of claim 1, wherein the network is a CSMA/CD network, the predetermined interpacket gap equal to ninety six (96) bit times and the predetermined slot time equal to at least five hundred twelve (512) bit times.

19. The method of claim 18, wherein the network has a data rate of 1000 megabits per second and the predetermined slot time is approximately four thousand ninety six (4096) bit times.

20. A network interface for connection with media of a network, comprising:

a carrier sensor sensing deassertion of a carrier on the media;

a programmable timer counting an integer multiple of a predetermined delay interval in response to the sensed deassertion of said carrier, the predetermined delay interval being related to a predetermined slot time;

a controller setting the integer between a range including zero and less than a number of stations (N) on the network in response to the sensed deassertion of said carrier; and a transmitter outputting a data packet onto the media in response to a determined absence of activity by said sensor during an interval following the deassertion of the carrier and including said integer multiple of predetermined delay intervals and a predetermined interpacket gap interval.

21. The interface of claim 20, wherein said timer counts said interval including said integer multiple of predetermined delay intervals and said predetermined interpacket gap interval.

22. The interface of claim 20, further comprising a interpacket gap timer counting said predetermined interpacket gap interval in response to a lapse of said programmable timer, the transmitter outputting said data packet in response to a lapse of said interpacket gap timer.

23. The interface of claim 22, wherein said programmable timer counts a collision backoff interval according to an exponential backoff algorithm in response to a detected collision.

24. The interface of claim 22, further comprising a deferral timer counting a maximum delay interval consisting of said predetermined interpacket gap interval and a maximum integer multiple of said predetermined delay interval, the maximum integer value being a maximum value of said range.

25. The interface of claim 24, wherein said maximum value equals N−1.

26. The interface of claim 20, further comprising a memory element storing said number of stations (N), the predetermined interpacket gap interval, and the predetermined slot time.

* * * * *